Patented Nov. 18, 1941

2,263,013

UNITED STATES PATENT OFFICE 2,263,013

ANTIOXIDANT FOR RUBBER

Winfield Scott, Akron, Ohio, assignor to Wingfoot Corporation, Wilmington, Del., a corporation of Delaware No Drawing. Application July 2, 1938, Serial No. 217,233

14 Claims. (Cl. 260—809)

This invention relates to the treatment of rubber. More particularly, it relates to a new class of compounds useful in retarding the deterioration of rubber by reason of ageing, oxidation, etc.

Many materials are known which assist in retarding the deterioration of rubber due to ageing, oxidation, flexing, etc. These age resisters vary greatly in composition and effect. By the present invention a new class of compounds useful as age resisters has been discovered which compounds are highly efficient for retarding the deterioration of rubber.

The age resisters of the invention are prepared by reacting alkylol amides with secondary aromatic amines. The alkylol amides, such as the methylol amides, may be prepared according to the process described in German Patent 164,610. These alkylol amides are then reacted with secondary aromatic amines by heating a mixture of the two, with or without a solvent, to a suitable temperature. A condensation apparently occurs whereby water is formed and given off. The end of the reaction may be gauged by collecting and measuring the amount of water splitting out of the reaction mass or by continuing the reaction until no more water is formed.

The preparation of the alkylol amides may be represented by the following equation:

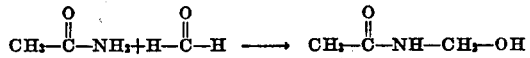

in which acetamide is reacted with formaldehyde to form an alkylol amide by a process of addition and rearrangement. When such an alkylol amide is reacted with a secondary amine there is apparently, as previously indicated, a condensation reaction as evidenced by the formation and elimination of water. The products obtained, however, are oily or resinous materials of indefinite composition, their constitution not being known with certainty. It is quite probable, however, that the reaction proceeds, at least in part, according to the following equation,

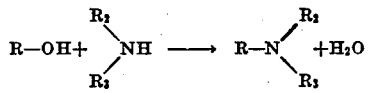

which demonstrates the condensation between the alkylol amide and the secondary aromatic amine. In the foregoing equation, R—OH represents an alkylol amide, and $R_2$ and $R_3$ represent aromatic radicals.

The preparation of the age registers of the invention may be illustrated by the following examples.

Example 1

Eighty-four and one-half parts of diphenyl amine were heated with 44½ parts of methylol acetamide over a period of 2 hours to a maximum temperature of 180° C. Eight and two-tenths parts of water were collected, the theoretical recovery being 9 parts. The reaction product was a light yellow oil.

Example 2

Thirty-four parts of diphenyl amine were heated slowly with 15 parts of methylol formamide to a temperature of 180–190° C. Three and two-tenths parts of water were obtained from the reaction, the theoretical being 3.6 parts. The reaction product was an amber colored oil.

Example 3

Eighty-six and six-tenths parts of N—N' diphenyl para phenylene diamine and 30 parts of methylol acetamide were heated slowly to a temperature of 180° C. Five and one-half parts of water were recovered, a theoretical quantity of 6 parts being possible. The reaction product was a dark resinous material which when ground was a gray powder.

Example 4

One molecular proportion of N—N' diphenyl para phenylene diamine and two molecular proportions of methylol acetamide were reacted by heating 86.6 parts of the former and 59.3 parts of the latter under the same conditions as obtained in Example 3. The amount of water collected from the reaction was practically a theoretical quantity.

Example 5

Eighty-seven and six-tenths parts of phenyl alpha naphthylamine and 35.6 parts of methylol acetamide were heated together for 2 hours to a maximum temperature of 200° C. The cooled reaction product was a soft resin in practically theoretical yield.

Example 6

Forty-four parts of phenyl alpha naphthylamine and 15 parts of methylol formamide were slowly heated to a temperature of 175° C. The product, obtained in almost theoretical yield, was a viscous oil.

Example 7

Phenyl beta naphthylamine and methylol acetamide were reacted in equimolecular proportions under conditions similar to the foregoing to give a semi-crystalline product which was easily ground to a brownish powder melting at 85–90° C.

Example 8

Phenyl beta naphthylamine was heated with methylol formamide in equimolecular proportions to a final temperature of 190° C. to give a soft brown resin. The yield, as measured by the water recovered and the amount of product, was practically theoretical.

Example 9

Thirty-eight parts of para hydroxy diphenyl amine and 18 parts of methylol acetamide were heated to 180° C. over a period of two hours, water being eliminated. The cooled product was a soft resin.

Example 10

Thio diphenyl amine (phenothiazine) and methylol acetamide were reacted in equimolecular proportions by heating the mixture to a maximum temperature of 200° C. The product was a soft brownish resin.

Example 11

Twenty-five parts of thio phenyl beta naphthylamine, having the structural formula

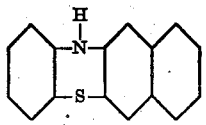

and 9 parts of methylol acetamide were heated to a final temperature of 200–220° C. to give a brown brittle resinous product in practically theoretical yield.

Example 12

When acetone and diphenyl amine are reacted under certain conditions, as, for example, by the process described in U. S. Patent 1,807,355, they yield a mixture of materials composed partly of secondary amines. Forty-two parts of such a reaction product of acetone and diphenylamine (obtained using iodine as a catalyst) and 18 parts of methylol acetamide were heated to 180–190° C., water being split off, and a hard friable resin softening near 100° C. was obtained.

The foregoing examples are illustrative and not limitative of the invention. Various other alkylol amides and secondary aromatic amines may be substituted for those employed in the examples. Imides derived from dibasic acids may be employed as well as the amides of monobasic acids represented above and described in the examples. Accordingly, the terms "amides" and "alkylol amides" when used in the specification and claims are intended to include the analogous imides. Other representative amides which may be employed in the preparation of alkylol amides suitable for use in the invention are benzamide, propionamide, butyramide, furoamide, o-salicylamide, stearamide, succinimide, malamide valeramide, lauramide, lactamide, malonamide, phthalimide, palmitamide and amides corresponding to oleic, capric, linoleic, tartaric, caproic, naphthoic acids. However, the amides of monobasic acids constitute a preferred class.

Any of these amides or other amides coming within the scope of the invention may be reacted with an aldehyde to form the corresponding alkylol amide. Of the aldehydes, formaldehyde is preferred, but other aldehydes, such as acetaldehyde, propionaldehyde, butyraldehyde, valeraldehyde, heptaldehyde, crotonaldehyde, acrylic aldehyde, alpha ethyl beta methyl acrolein, aldol, benzaldehyde, cuminic aldehyde, cinnamic aldehyde, tetrahydro furfuryl aldehyde, furfuryl aldehyde, naphthaldehyde, furyl acrolein, beta hydroxy naphthaldehyde, benzaldehyde, alpha ethyl beta propyl acrolein, etc. also may be employed.

Alkylol amides prepared by suitably reacting any of the foregoing or other aldehydes and amides may then be reacted with any secondary aromatic amine to form the age resisters of the invention. Although any secondary aromatic amine may be so reacted, strongly acidic substituents, such as nitro, sulfonic and carboxylic groups, tend to lessen the value of the products as age resisters and therefore the materials should preferably not contain such groups. Representative of the secondary aromatic amines are diphenylamine, N—N' di-phenyl-p-phenylene diamine, N-phenyl-n'-o-tolyl-p-phenylene diamine, phenyl alpha naphthylamine, phenyl beta naphthylamine, p-hydroxy diphenylamine, thiodiphenylamine (phenothiazine), thiophenyl beta naphthylamine, the reaction product of acetone and diphenylamine, di alpha naphthylamine, ditolylamines, phenoxazine, di beta naphthylamine, phenyl-o-tolylamine, phenyl p-tolylamine, N-phenyl-p-phenetidine, N-phenyl-o-anisidine, N-beta naphthyl-o-phenetidine and other secondary aromatic amines, which may include various substituents, such as alkyl, aryl, aralkyl, alkoxy, aryloxy, hydroxy, halogen and amino groups and others.

Although, in the specific examples given to illustrate the invention, the proportions of alkylol amide and secondary aromatic amine have been substantially equivalent proportions, these proportions are not critical but may be varied considerably while still obtaining products useful in the invention. The materials obtained are generally oily or resinous mixtures even when equivalent proportions are employed and, as a general rule, the products obtained by using proportions other than equivalent may be used without further purification or separation into components. The temperature employed must be high enough to cause reaction of the ingredients and should be held below the point at which substantial decomposition of the ingredients or the final product occurs. Although aside from these considerations the temperature is not critical, it will ordinarily be desirable to operate at a temperature of about 120–200° C. and this is the preferred range. The reaction is conveniently carried out at atmospheric pressure with satisfactory results but pressures above and below atmospheric may also be employed.

In testing the products of the above examples, two rubber formulae, A and B, were used. Formula A represents a typical "pure gum" stock, while B is a stock such as is used in tire threads. Formula A was as follows:

| | Parts by weight |
|---|---|
| Extracted pale crepe rubber | 100.0 |
| Zinc oxide | 5.0 |
| Stearic acid | 1.5 |
| Sulfur | 3.0 |
| Hexamethylenetetramine | 1.0 |
| Age resister | 1.0 |

In this stock extracted pale crepe rubber was used to eliminate the effect of any natural antioxidant contained in the rubber, and all age resisting effect is presumed to be due to that of the added antioxidant.

Formula B, representing a tread stock, was as follows:

| | Parts by weight |
|---|---|
| Smoked sheet rubber | 100.0 |
| Zinc oxide | 3.25 |
| Carbon black | 50.75 |
| Stearic acid | 3.50 |
| Pine tar | 3.00 |
| Sulfur | 2.75 |
| 2-mercaptobenzothiazole | As shown |
| Age resister | 1.00 |

The quantities of 2-mercaptobenzothiazole employed in Formula B were

| Example | Parts by weight |
|---|---|
| 1-7 | 1.35 |
| 8-9 | 1.15 |
| 10 | 1.00 |
| 11 | 0.85 |
| 12 | 1.35 |

Samples prepared from stock A were given an accelerated age test known as the "low temperature" test. It was carried out in a Bierer-Davis bomb in an atmosphere of oxygen for 6 days at 50° C. and 150 pounds per square inch pressure. Samples from Stock B were given a "high temperature" test. By this method the samples were aged in the Bierer-Davis bomb in an atmosphere of air for 7 hours at 114° C. and 80 pounds per square inch pressure. Cures are expressed as minutes at degrees Fahrenheit. Tensiles and modulus figures are kgs./cm². Elongation is expressed in per cent.

|  | Stock A | | | | |  | Stock B | | | | |
|---|---|---|---|---|---|---|---|---|---|---|---|
|  | Cure | Tens. | Elo. | 500% | 700% |  | Cure | Tens. | Elo. | 300% | 500% |

EXAMPLE 1

|  | Cure | Tens. | Elo. | 500% | 700% |  | Cure | Tens. | Elo. | 300% | 500% |
|---|---|---|---|---|---|---|---|---|---|---|---|
| Orig | 35/285 | 96 | 835 | 14 | 44 | Orig | 35/260 | 154 | 580 | 51 | 122 |
| Aged | 35/285 | 86 | 800 | 16 | 45 | Aged | 35/260 | 144 | 525 | 72 | 135 |
| Orig | 50/285 | 112 | 775 | 20 | 72 | Orig | 50/260 | 222 | 605 | 78 | 169 |
| Aged | 50/285 | 107 | 765 | 20 | 71 | Aged | 50/260 | 189 | 595 | 84 | 160 |
| Orig | 70/285 | 140 | 730 | 30 | 118 | Orig | 70/260 | 268 | 605 | 98 | 204 |
| Aged | 70/285 | 127 | 740 | 27 | 100 | Aged | 70/260 | 200 | 550 | 105 | 180 |
|  |  |  |  |  |  | Orig | 100/260 | 286 | 595 | 107 | 226 |
|  |  |  |  |  |  | Aged | 100/260 | 193 | 535 | 104 | 180 |

EXAMPLE 2

|  | Cure | Tens. | Elo. | 500% | 700% |  | Cure | Tens. | Elo. | 300% | 500% |
|---|---|---|---|---|---|---|---|---|---|---|---|
| Orig | 35/285 | 108 | 840 | 15 | 45 | Orig | 35/260 | 218 | 680 | 48 | 126 |
| Aged | 35/285 | 105 | 810 | 18 | 56 | Aged | 35/260 | 202 | 675 | 76 | 150 |
| Orig | 50/285 | 128 | 810 | 19 | 64 | Orig | 50/260 | 298 | 675 | 78 | 183 |
| Aged | 50/285 | 131 | 760 | 25 | 89 | Aged | 50/260 | 230 | 615 | 96 | 180 |
| Orig | 70/285 | 148 | 780 | 24 | 88 | Orig | 70/260 | 326 | 665 | 98 | 214 |
| Aged | 70/285 | 150 | 745 | 30 | 109 | Aged | 70/260 | 228 | 585 | 108 | 194 |
|  |  |  |  |  |  | Orig | 100/260 | 318 | 620 | 110 | 238 |
|  |  |  |  |  |  | Aged | 100/260 | 220 | 500 | 130 | 220 |

EXAMPLE 3

|  | Cure | Tens. | Elo. | 500% | 700% |  | Cure | Tens. | Elo. | 300% | 500% |
|---|---|---|---|---|---|---|---|---|---|---|---|
| Orig | 35/285 | 110 | 800 | 20 | 64 | Orig | 35/260 | 182 | 575 | 64 | 147 |
| Aged | 35/285 | 115 | 755 | 25 | 82 | Aged | 35/260 | 168 | 555 | 83 | 154 |
| Orig | 50/285 | 128 | 785 | 24 | 78 | Orig | 50/260 | 236 | 590 | 90 | 194 |
| Aged | 50/285 | 134 | 755 | 29 | 98 | Aged | 50/260 | 189 | 545 | 94 | 171 |
| Orig | 70/285 | 162 | 765 | 30 | 107 | Orig | 70/260 | 280 | 590 | 102 | 221 |
| Aged | 70/285 | 160 | 740 | 36 | 128 | Aged | 70/260 | 205 | 540 | 105 | 191 |
|  |  |  |  |  |  | Orig | 100/260 | 284 | 560 | 120 | 244 |
|  |  |  |  |  |  | Aged | 100/260 | 208 | 500 | 130 | 208 |

EXAMPLE 4

|  | Cure | Tens. | Elo. | 500% | 700% |  | Cure | Tens. | Elo. | 300% | 500% |
|---|---|---|---|---|---|---|---|---|---|---|---|
| Orig | 35/285 | 106 | 835 | 16 | 50 | Orig | 35/260 | 166 | 610 | 54 | 126 |
| Aged | 35/285 | 118 | 800 | 19 | 65 | Aged | 35/260 | 142 | 550 | 68 | 130 |
| Orig | 50/285 | 118 | 780 | 21 | 75 | Orig | 50/260 | 214 | 590 | 79 | 175 |
| Aged | 50/285 | 140 | 775 | 24 | 89 | Aged | 50/260 | 170 | 560 | 80 | 150 |
| Orig | 70/285 | 134 | 750 | 26 | 99 | Orig | 70/260 | 256 | 600 | 91 | 199 |
| Aged | 70/285 | 158 | 750 | 30 | 117 | Aged | 70/260 | 157 | 475 | 92 |  |
|  |  |  |  |  |  | Orig | 100/260 | 280 | 600 | 112 | 230 |
|  |  |  |  |  |  | Aged | 100/260 | 172 | 485 | 107 |  |

EXAMPLE 5

|  | Cure | Tens. | Elo. | 500% | 700% |  | Cure | Tens. | Elo. | 300% | 500% |
|---|---|---|---|---|---|---|---|---|---|---|---|
| Orig | 35/285 | 109 | 810 | 19 | 59 | Orig | 35/260 | 172 | 615 | 53 | 127 |
| Aged | 35/285 | 123 | 795 | 21 | 71 | Aged | 35/260 | 145 | 565 | 64 | 126 |
| Orig | 50/285 | 135 | 810 | 22 | 71 | Orig | 50/260 | 228 | 605 | 80 | 177 |
| Aged | 50/285 | 135 | 765 | 28 | 96 | Aged | 50/260 | 168 | 560 | 84 | 150 |
| Orig | 70/285 | 148 | 755 | 29 | 103 | Orig | 70/260 | 274 | 615 | 102 | 212 |
| Aged | 70/285 | 159 | 750 | 33 | 119 | Aged | 70/260 | 171 | 525 | 94 | 164 |

EXAMPLE 6

|  | Cure | Tens. | Elo. | 500% | 700% |  | Cure | Tens. | Elo. | 300% | 500% |
|---|---|---|---|---|---|---|---|---|---|---|---|
| Orig | 35/285 | 110 | 850 | 14 | 44 | Orig | 35/260 | 226 | 680 | 53 | 133 |
| Aged | 35/285 | 120 | 820 | 18 | 58 | Aged | 35/260 | 192 | 660 | 72 | 142 |
| Orig | 50/285 | 126 | 795 | 20 | 67 | Orig | 50/260 | 276 | 650 | 76 | 178 |
| Aged | 50/285 | 122 | 775 | 22 | 75 | Aged | 50/260 | 218 | 630 | 93 | 176 |
| Orig | 70/285 | 158 | 780 | 25 | 93 | Orig | 70/260 | 318 | 685 | 95 | 208 |
| Aged | 70/285 | 144 | 750 | 28 | 104 | Aged | 70/260 | 222 | 575 | 110 | 196 |
|  |  |  |  |  |  | Orig | 100/260 | 318 | 625 | 114 | 240 |
|  |  |  |  |  |  | Aged | 100/260 | 217 | 525 | 123 | 208 |

EXAMPLE 7

|  | Cure | Tens. | Elo. | 500% | 700% |  | Cure | Tens. | Elo. | 300% | 500% |
|---|---|---|---|---|---|---|---|---|---|---|---|
| Orig | 35/285 | 102 | 850 | 15 | 45 | Orig | 35/260 | 236 | 700 | 50 | 130 |
| Aged | 35/285 | 114 | 800 | 20 | 64 | Aged | 35/260 | 178 | 630 | 66 | 133 |
| Orig | 50/285 | 116 | 800 | 20 | 64 | Orig | 50/260 | 286 | 670 | 72 | 177 |
| Aged | 50/285 | 130 | 775 | 24 | 82 | Aged | 50/260 | 178 | 575 | 83 | 155 |
| Orig | 70/285 | 144 | 785 | 25 | 88 | Orig | 70/260 | 314 | 665 | 90 | 208 |
| Aged | 70/285 | 136 | 740 | 30 | 109 | Aged | 70/260 | 200 | 600 | 96 | 170 |
|  |  |  |  |  |  | Orig | 100/260 | 326 | 640 | 112 | 238 |
|  |  |  |  |  |  | Aged | 100/260 | 172 | 490 | 105 |  |

| Stock A | | | | | | Stock B | | | | |
|---|---|---|---|---|---|---|---|---|---|---|
| Cure | Tens. | Elo. | 500% | 700% | | Cure | Tens. | Elo. | 300% | 500% |

EXAMPLE 8

| Stock A | | | | | | Stock B | | | | |
|---|---|---|---|---|---|---|---|---|---|---|
| Orig | 35/285 | 106 | 860 | 14 | 42 | Orig | 35/260 | 246 | 675 | 57 | 146 |
| Aged | 35/285 | 120 | 830 | 18 | 57 | Aged | 35/260 | 166 | 605 | 69 | 135 |
| Orig | 50/285 | 127 | 815 | 18 | 63 | Orig | 50/260 | 305 | 685 | 82 | 190 |
| Aged | 50/285 | 136 | 800 | 21 | 74 | Aged | 50/260 | 200 | 625 | 90 | 164 |
| Orig | 70/285 | 154 | 770 | 27 | 99 | Orig | 70/260 | 326 | 660 | 101 | 220 |
| Aged | 70/285 | 155 | 765 | 27 | 102 | Aged | 70/260 | 192 | 555 | 100 | 175 |
| | | | | | | Orig | 100/260 | 342 | 650 | 116 | 246 |
| | | | | | | Aged | 100/260 | 184 | 490 | 111 | ----- |

EXAMPLE 9

| Stock A | | | | | | Stock B | | | | |
|---|---|---|---|---|---|---|---|---|---|---|
| Orig | 35/285 | 90 | 790 | 17 | 53 | Orig | 35/260 | 142 | 570 | 48 | 118 |
| Aged | 35/285 | 118 | 770 | 23 | 80 | Aged | 35/260 | 104 | 475 | 55 | ----- |
| Orig | 50/285 | 128 | 810 | 20 | 64 | Orig | 50/260 | 208 | 550 | 78 | 180 |
| Aged | 50/285 | 134 | 765 | 25 | 89 | Aged | 50/260 | 120 | 475 | 70 | ----- |
| Orig | 70/285 | 160 | 780 | 28 | 98 | Orig | 70/260 | 268 | 605 | 98 | 207 |
| Aged | 70/285 | 152 | 730 | 34 | 126 | Aged | 70/260 | 122 | 435 | 81 | ----- |
| | | | | | | Orig | 100/260 | 288 | 590 | 112 | 232 |
| | | | | | | Aged | 100/260 | 114 | 355 | 92 | ----- |

EXAMPLE 10

| Stock A | | | | | | Stock B | | | | |
|---|---|---|---|---|---|---|---|---|---|---|
| Orig | 35/285 | 86 | 850 | 12 | 34 | Orig | 35/260 | 244 | 660 | 58 | 148 |
| Aged | 35/285 | 108 | 845 | 15 | 46 | Aged | 35/260 | 214 | 645 | 85 | 164 |
| Orig | 50/285 | 116 | 825 | 17 | 53 | Orig | 50/260 | 296 | 675 | 82 | 191 |
| Aged | 50/285 | 126 | 800 | 20 | 68 | Aged | 50/260 | 236 | 620 | 105 | 190 |
| Orig | 70/285 | 138 | 800 | 21 | 74 | Orig | 70/260 | 318 | 655 | 101 | 225 |
| Aged | 70/285 | 120 | 740 | 27 | 98 | Aged | 70/260 | 226 | 555 | 120 | 206 |
| | | | | | | Orig | 100/260 | 330 | 640 | 115 | 245 |
| | | | | | | Aged | 100/260 | 230 | 525 | 136 | 222 |

EXAMPLE 11

| Stock A | | | | | | Stock B | | | | |
|---|---|---|---|---|---|---|---|---|---|---|
| Orig | 35/285 | 102 | 840 | 15 | 45 | Orig | 35/260 | 246 | 665 | 60 | 147 |
| Aged | 35/285 | 108 | 795 | 20 | 60 | Aged | 35/260 | 188 | 640 | 68 | 138 |
| Orig | 50/285 | 129 | 820 | 20 | 66 | Orig | 50/260 | 307 | 675 | 83 | 191 |
| Aged | 50/285 | 126 | 770 | 25 | 86 | Aged | 50/260 | 216 | 630 | 95 | 170 |
| Orig | 70/285 | 148 | 780 | 25 | 89 | Orig | 70/260 | 314 | 645 | 100 | 220 |
| Aged | 70/285 | 136 | 730 | 30 | 108 | Aged | 70/260 | 198 | 540 | 106 | 180 |
| | | | | | | Orig | 100/260 | 322 | 625 | 116 | 246 |
| | | | | | | Aged | 100/260 | 170 | 430 | 114 | ----- |

EXAMPLE 12

| Stock A | | | | | | Stock B | | | | |
|---|---|---|---|---|---|---|---|---|---|---|
| Orig | 35/285 | 119 | 850 | 16 | 51 | Orig | 35/260 | 220 | 665 | 54 | 136 |
| Aged | 35/285 | 106 | 785 | 20 | 64 | Aged | 35/260 | 186 | 650 | 72 | 141 |
| Orig | 50/285 | 132 | 795 | 22 | 75 | Orig | 50/260 | 280 | 665 | 76 | 182 |
| Aged | 50/285 | 118 | 740 | 27 | 92 | Aged | 50/260 | 194 | 585 | 85 | 162 |
| Orig | 70/285 | 145 | 765 | 28 | 100 | Orig | 70/260 | 324 | 675 | 100 | 218 |
| Aged | 70/285 | 111 | 705 | 32 | 108 | Aged | 70/260 | 206 | 570 | 100 | 180 |
| | | | | | | Orig | 100/260 | 324 | 640 | 114 | 240 |
| | | | | | | Aged | 100/260 | 194 | 515 | 112 | 189 |

These data clearly demonstrate the efficacy of the compounds of the invention in maintaining the physical qualities of rubber, such as tensile and modulus, during ageing.

Although only certain particular forms of the invention have been described in detail, it will be apparent to those skilled in the art that various modifications may be made therein without departing from the spirit of the invention and the scope of the appended claims.

What I claim is:

1. The method of preserving rubber which comprises incorporating therein an age-resister obtained by reacting, at a temperature of about 130 to 200° C. and with attendant splitting out of water, a secondary aromatic amine with an N-alkylol amide.

2. The method of preserving rubber which comprises incorporating therein an age-resister obtained by reacting a secondary aromatic amine with an N-methylol amide with attendant splitting out of water.

3. The method of preserving rubber which comprises incorporating therein an age-resister obtained by reacting a secondary aromatic amine and N-methylol formamide with attendant splitting out of water.

4. The method of preserving rubber which comprises incorporating therein an age-resister obtained by reacting a secondary aromatic amine and N-methylol acetamide with attendant splitting out of water.

5. The method of preserving rubber which comprises incorporating therein an age-resister obtained by reacting diphenyl amine and N-methylol formamide with attendant splitting out of water.

6. The method of preserving rubber which comprises incorporating therein an age-resister obtained by reacting diphenyl amine and N-methylol acetamide with attendant splitting out of water.

7. The method of preserving rubber which comprises incorporating therein an age-resister obtained by reacting a secondary arylamine and an N-methylol aliphatic amide with attendant splitting out of water.

8. A rubber product which has been vulcanized in the presence of an age-resister obtained by reacting, at a temperature of about 130 to 200° C. and with attendant splitting out of water, a secondary aromatic amine with an N-alkylol amide.

9. A rubber product which has been vulcanized in the presence of an age-resister obtained by reacting a secondary aromatic amine with an N-methylol amide with attendant splitting out of water.

10. A rubber product which has been vulcanized in the presence of an age-resister obtained by reacting a secondary aromatic amine and N-methylol formamide with attendant splitting out of water.

11. A rubber product which has been vulcanized in the presence of an age-resister obtained by reacting a secondary aromatic amine and N-methylol acetamide with attendant splitting out of water.

12. A rubber product which has been vulcanized in the presence of an age-resister obtained by reacting diphenyl amine and N-methylol formamide with attendant splitting out of water.

13. A rubber product which has been vulcanized in the presence of an age-resister obtained by reacting diphenyl amine and N-methylol acetamide with attendant splitting out of water.

14. A rubber product which has been vulcanized in the presence of an age-resister obtained by reacting a secondary arylamine and an N-methylol aliphatic amide with attendant splitting out of water.

WINFIELD SCOTT.